(12) United States Patent
Heigl et al.

(10) Patent No.: US 9,114,774 B2
(45) Date of Patent: Aug. 25, 2015

(54) AIR BAG MODULE COMPRISING AN AIR BAG, IN PARTICULAR A SIDE HEAD AIR BAG

(75) Inventors: Juergen Heigl, Boebingen (DE); Birnbaum Rolan, Schwaebisch Gmuend (DE); Waldemar Schmiss, Stuttgart (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 879 days.

(21) Appl. No.: 12/501,663

(22) Filed: Jul. 13, 2009

(65) Prior Publication Data
US 2010/0001499 A1    Jan. 7, 2010

(30) Foreign Application Priority Data
Jul. 17, 2008   (DE) .......................... 10 2008 033 694

(51) Int. Cl.
| | | |
|---|---|---|
| *B60R 21/213* | (2011.01) | |
| *B60R 21/201* | (2011.01) | |
| *B60R 21/217* | (2011.01) | |

(52) U.S. Cl.
CPC ............ *B60R 21/213* (2013.01); *B60R 21/201* (2013.01); *B60R 21/217* (2013.01)

(58) Field of Classification Search
CPC ...... B60R 21/20; B60R 21/21; B60R 21/213; B60R 21/214
USPC ............. 280/728.2, 730.2; 24/289, 291, 292, 24/295, 265 A, 265 AL, 265 R; 248/201, 248/500, 503, 505; 411/175
See application file for complete search history.

(56) References Cited

U.S. PATENT DOCUMENTS

| | | | | |
|---|---|---|---|---|
| 6,082,761 | A * | 7/2000 | Kato et al. ................. | 280/730.2 |
| 6,336,779 | B1 * | 1/2002 | Jakob et al. .................. | 411/175 |
| 7,159,896 | B2 * | 1/2007 | Ochiai et al. ............... | 280/730.2 |
| 7,188,393 | B2 * | 3/2007 | Kawai ............................. | 24/297 |
| 7,328,911 | B2 * | 2/2008 | Chapman .................. | 280/728.2 |
| 7,331,602 | B2 * | 2/2008 | Ochiai et al. ............... | 280/730.2 |

(Continued)

FOREIGN PATENT DOCUMENTS

| | | | |
|---|---|---|---|
| DE | 102004035464 A1 * | 3/2006 | |
| DE | 102004059382 A1 * | 6/2006 | |

(Continued)

OTHER PUBLICATIONS

Noriko Katagiri, Curtain Airbag Device, Jul. 19, 2007, JPO, JP 2007-182134 A, English Abstract.*

(Continued)

*Primary Examiner* — James English
(74) *Attorney, Agent, or Firm* — Tarolli, Sundheim, Covell & Tummino LLP (57) ABSTRACT

An air bag module (10) comprises an air bag (12) including a folded package portion (18) and a mounting portion (20). The package portion (18) has a front side (26) and a rear side (28). The rear side (28) is that side which faces a vehicle part on which the air bag (12) is mounted. Additionally provided are a mounting unit (14) which, with an insertion end (46) thereof, extends through the mounting portion (20) and a protective cover (24) partly enclosing the folded package portion (18). In the mounted state, the mounting portion (20) is located on the rear side (28) of the package portion (18). With its insertion end (46), the mounting unit (14) extends away from the package portion (18).

16 Claims, 7 Drawing Sheets

(56) References Cited

U.S. PATENT DOCUMENTS

| | | |
|---|---|---|
| 7,404,571 B2 * | 7/2008 | Stevens ................... 280/728.2 |
| 7,631,889 B2 * | 12/2009 | Watanabe ................ 280/728.2 |
| 7,823,914 B2 * | 11/2010 | Cheal et al. ............. 280/730.2 |
| 2003/0222435 A1 * | 12/2003 | Schmidt et al. ......... 280/728.2 |
| 2006/0197316 A1 * | 9/2006 | Watanabe ................ 280/728.2 |
| 2006/0197317 A1 * | 9/2006 | Watanabe ................ 280/728.2 |
| 2007/0273128 A1 * | 11/2007 | Cheal ...................... 280/728.2 |
| 2008/0014045 A1 * | 1/2008 | Kawai ........................... 411/45 |
| 2008/0084050 A1 * | 4/2008 | Volkmann et al. ...... 280/728.2 |
| 2008/0235919 A1 * | 10/2008 | Giddings et al. ............ 24/289 |
| 2008/0284141 A1 * | 11/2008 | Jang et al. ............... 280/728.2 |
| 2010/0066060 A1 * | 3/2010 | Kalandek ................. 280/728.2 |
| 2010/0199464 A1 * | 8/2010 | Sano ............................ 24/289 |

FOREIGN PATENT DOCUMENTS

| | | | |
|---|---|---|---|
| DE | 102006041704 A1 * | 3/2008 | |
| JP | 2007182134 A * | 7/2007 | |

OTHER PUBLICATIONS

Noriko Katagiri, Curtain Airbag Device, Jul. 19, 2007, JPO, JP 2007-182134 A, Machine Translation of Description.*

* cited by examiner

AIR BAG MODULE COMPRISING AN AIR BAG, IN PARTICULAR A SIDE HEAD AIR BAG

The present invention relates to an air bag module comprising an air bag, in particular a side head air bag.

Air bags are used in motor vehicles to protect a vehicle occupant from hitting hard body parts of the vehicle in the event of a collision.

Side head air bags are usually mounted in the roof frame region and, upon lateral collision, inflate between a vehicle occupant and the side parts of the vehicle, for instance, so as to protect the occupant's head from hitting hard body parts.

It is an object of the present invention to provide an air bag module having a low installation height.

To achieve this object an air bag module is provided comprising an air bag which includes a folded package portion and a mounting portion, the package portion having a front side and a rear side, and the rear side being that side which faces a vehicle part on which the air bag is mounted. Additionally provided are a mounting unit which, with an insertion end thereof, extends through the mounting portion and a protective cover partly enclosing the folded package portion. In the mounted state, the mounting portion is located on the rear side of the package portion. With its insertion end, the mounting unit extends away from the package portion. Thus, the air bag has a low installation height since no installation space is needed above the air bag for mounting it.

Preferably, the mounting portion is attached to the upper edge of the rear side of the package portion. Thus, the package portion is suspended from the mounting portion, completely covering the same.

In a preferred embodiment the mounting unit extends with its insertion end through the protective cover and fixes the same in position at a vehicle part. Thereby, the protective cover and the package portion of the air bag folded therein are fixed in position relative to the mounting portion and the mounting unit. The air bag package is connected to the mounting unit to better maintain its shape.

Preferably, an inner and an outer clamping plate are provided. In the mounted state of the air bag, the inner clamping plate is located between the package portion and the mounting portion, and the outer clamping plate is located between the mounting portion and a vehicle part. The mounting unit fixes the clamping plates in position at the mounting portion. The mounting portion is flatly sandwiched between the clamping plates such that forces acting on the mounting portion are distributed more evenly.

In the mounted state, the inner clamping plate may be located at least partly between the protective cover and the package portion. Thus, the protective cover and the folded package portion accommodated therein are positioned even better relative to the mounting unit and are fixed in position at a vehicle part.

Preferably, the inner clamping plate and the outer clamping plate are integrally connected to each other by means of a bendable portion. The number of components is reduced and the manufacturing costs are thus lowered.

The mounting unit can be designed to fix the inner clamping plate and the outer clamping plate in position relative to each other. In this way the clamping plates are fixed in position at the mounting portion of the air bag prior to mounting of the air bag module. This simplifies mounting of the air bag module.

Preferably, the mounting unit includes locking projections for fixing the clamping plates in position and/or for mounting the air bag module on a vehicle part. Thus, the air bag module can be mounted on the vehicle in a simple manner without any tools being required. Fixing the clamping plates in position relative to each other is also possible without any additional auxiliary means.

The mounting unit is preferably made of metal.

In a preferred embodiment, the mounting portion is a tongue of the air bag wall. The air bag can be manufactured integrally with the mounting portion and no additional manufacturing steps are needed for joining the air bag and the mounting portion.

The installation height for side head air bag modules is limited; therefore the air bag module according to the present invention is ideally suited for use as side head air bag module.

Additional features and advantages will be apparent from the following description with particular reference to the accompanying drawings, in which.

Figure 1:
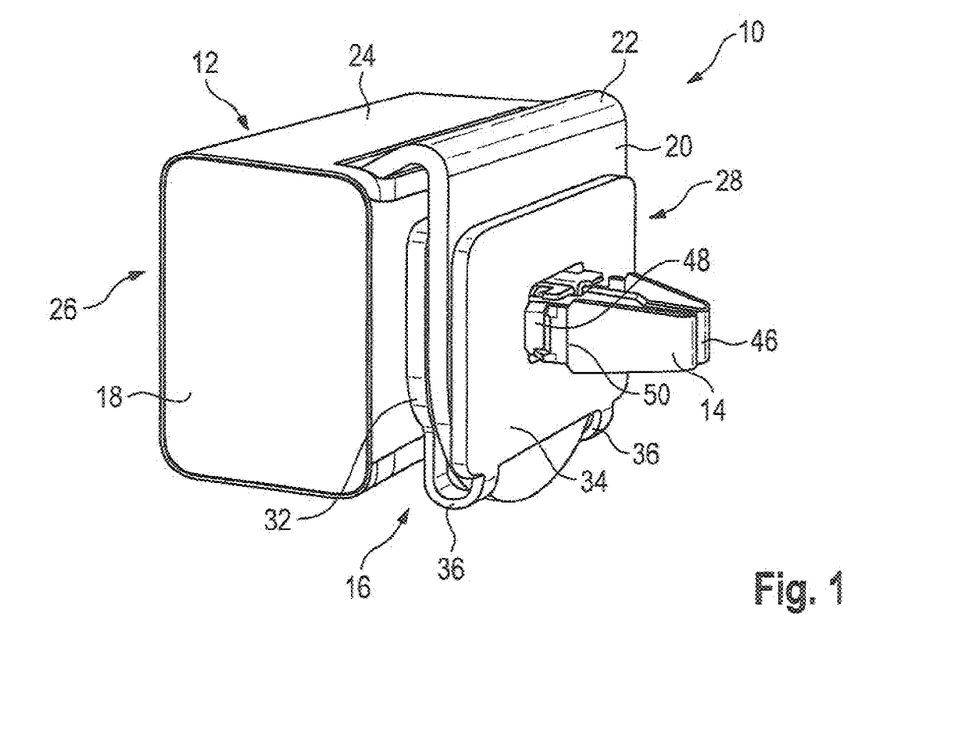
FIG. 1 shows a perspective sectional view of an air bag module according to the invention.

FIG. 1 shows an air bag module 10 comprising an air bag 12, a mounting unit 14 and a clamping plate unit 16. The air bag 12 includes a folded package portion 18 and a mounting portion 20. The mounting portion 20 is attached to an upper edge 22 of the package portion 18 and is in particular designed as fabric flap integrally connected to the air bag 12. The package portion 18 is folded in the conventional manner and is held in shape and in its folded state by a protective cover 24. However, the mounting portion 20 may also be a component manufactured separately from the air bag 12. In particular, the mounting portion 20 need not be attached to the upper edge 22 of the package portion 18 as shown in FIG. 1.

The air bag package portion 18 has a front side 26 and a rear side 28, the rear side 28 being that side which faces a vehicle part (not shown) on which the air bag 12 is mounted. The flexible mounting portion 20 is, at the transition to the upper edge 22 of the package portion 18, bent down and placed on the rear side 28 of the package portion 18.

Figure 2:
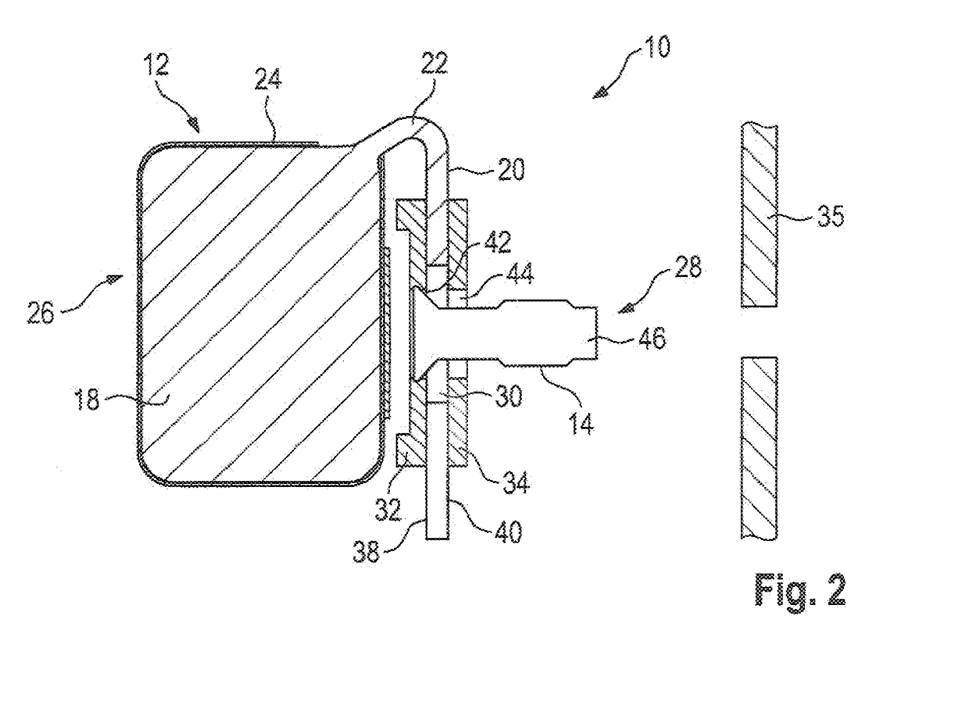
FIG. 2 shows a cross-sectional view of the air bag module according to FIG. 1.

The mounting portion 20 has an opening 30 through which the mounting unit 14 protrudes (cf. FIG. 2).

Figure 4:
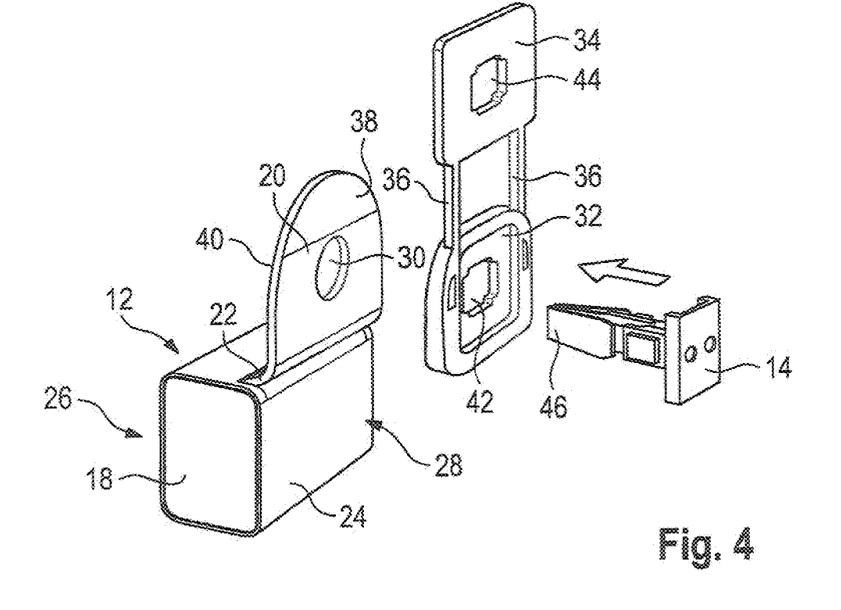
FIG. 4 shows a second step for assembly of the air bag module according to FIG. 1.

The clamping plate unit 16 includes an inner clamping plate 32 and an outer clamping plate 34 integrally connected to each other by means of a bendable portion 36 (FIG. 4). The inner clamping plate 32 is at least partly located between the folded package portion 18 and the front side 38 of the bent mounting portion 20. The outer clamping plate 34 is located between the rear side 40 of the mounting portion 20 and a vehicle part 35 on which the air bag is mounted (cf. FIG. 2).

The inner clamping plate 32 and the outer clamping plate 34 have an opening 42, 44, respectively. With an insertion end 46 thereof, the mounting unit 14 protrudes away from the air bag package first through the opening 42 of the inner clamping plate 32 and subsequently through the opening 44 of the outer clamping plate 34. The mounting portion 20 is sandwiched between the clamping plates 32, 34 such that the opening 30 of the mounting portion 20 is located exactly between the openings 42, 44 of the clamping plates 32, 34 and the mounting unit 14 protrudes through the opening 30.

The mounting unit 14 includes locking projections 48 (FIG. 1) for fixing the inner clamping plate 32 and the outer clamping plate 34 in position relative to each other. Additional locking projections 50 are provided for mounting the air bag module 10 on the vehicle part 35 by means of the mounting unit 14. To this end the mounting unit 14 is, with its insertion end 46 ahead, inserted into said vehicle part 35 until the locking projections 50 engage in the vehicle part.

In particular, the vehicle part 35 is a roof frame.

The assembly of an air bag module 10 of the inventive type is described in FIGS. 3 to 7.

Figure 3:
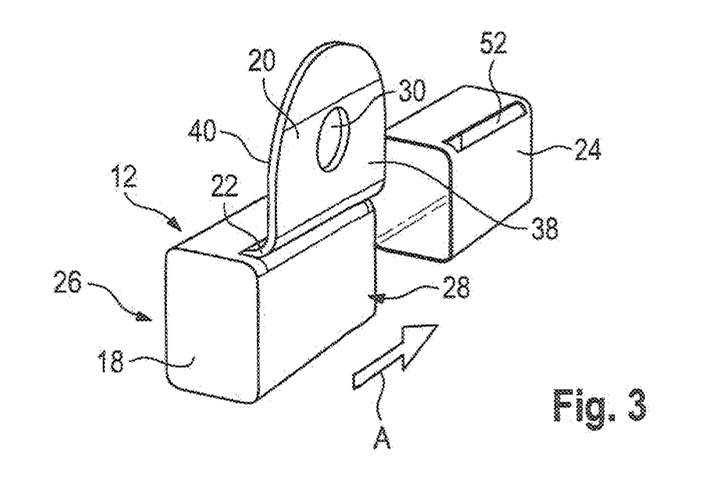
FIG. 3 shows a first step for assembly of the air bag module according to FIG. 1.

In a first step, the folded air bag 12 is connected to the protective cover 24. The package portion 18 of the air bag 12 is already folded and the mounting portion 20 points away from the package portion 18.

The protective cover 24 has a cylindrical shape for radially enclosing the air bag package 18 and is, for instance, open at both ends. The protective cover 24 has an axially extending slot 52 through which the mounting portion 20 of the air bag 12 is guided and protrudes outwardly. The air bag 12 is inserted, for instance, in the axial direction A into the protective cover 24 (FIG. 3) and the mounting portion 20 is subsequently guided outwardly through slot 52. The protective cover 24 may be a flexible cover made from fabric, film material or the like or an intrinsically stiff cover.

In a next step, the mounting unit 14 is connected to the clamping plate unit 16. The clamping plate unit 16 is designed here as flat plastic plate and is thus easy to manufacture. With its insertion end 46 ahead, the mounting unit 14 is guided through the opening 42 of the inner clamping plate 32 (FIG. 4).

Figure 5:
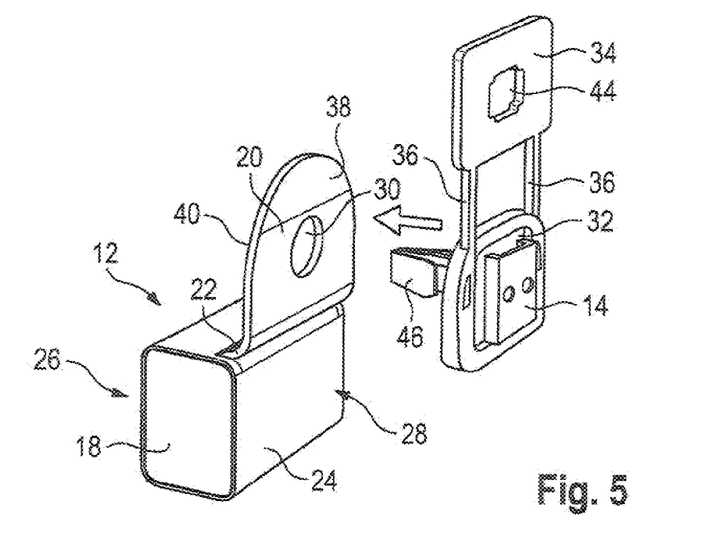
FIG. 5 shows a third step for assembly of the air bag module according to FIG. 1.
Figure 6:
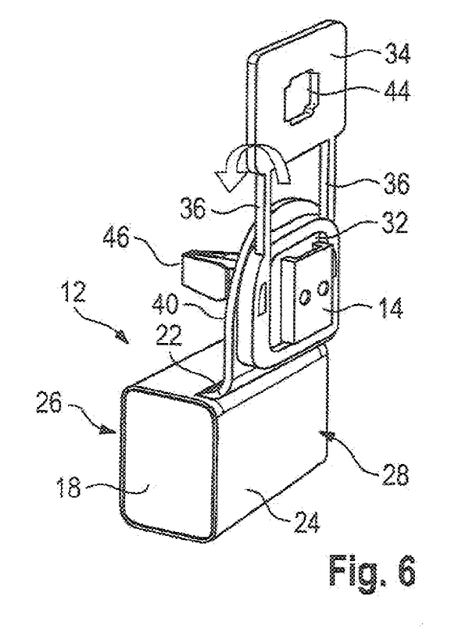
FIG. 6 shows a fourth step for assembly of the air bag module according to FIG. 1.

Then the inner clamping plate 32 is, together with the mounting unit 14, fastened to the mounting portion 20 of the air bag 12 (FIG. 5). To this end, the mounting unit 14 is, with its insertion end 46 ahead, guided from the front side 38 of the mounting portion 20 through the opening 30 of the mounting portion 20 until the inner clamping plate 32 rests flatly against the front side 38 of the mounting portion 20.

Subsequently, the clamping unit 16 is bent at the bendable portion 36 (FIG. 6) until the outer clamping plate 34 rests flatly against the rear side 40 of the mounting portion 20. With its insertion end 46, the mounting unit 14 penetrates through the opening 44 of the outer clamping plate 34. The mounting unit 14 is pushed towards the outer clamping plate 34 until the locking projections 48 of the mounting unit 14 engage on that side of the outer clamping plate 34 which faces the inner clamping plate 32. Thus, the inner clamping plate 32 and the outer clamping plate 34 are securely fastened to the mounting portion 20 of the air bag 12 by means of the mounting unit 14.

Figure 7:
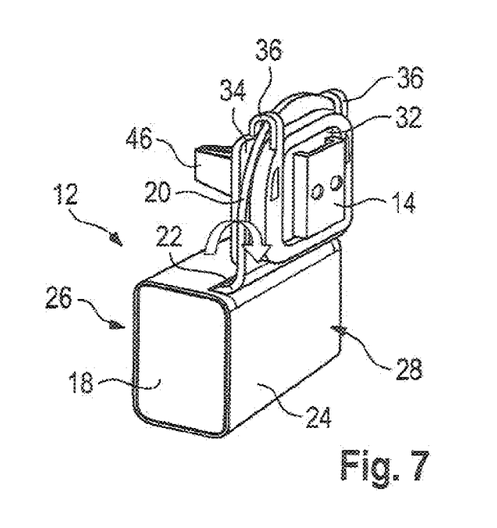
FIG. 7 shows a further step for assembly of the air bag module according to FIG. 1.

In a next step, the mounting portion 20 is, together with the inner clamping plate 32 and the outer clamping plate 34, folded to the rear side 28 of the air bag 12 (FIG. 7). In this position, the mounting unit 14 with its insertion end 46 points away from the air bag 12.

Thus, the air bag module 10 can be mounted on the vehicle part 35 with the insertion end 46 of the mounting unit 14 ahead. For this purpose, the air bag module 10 is inserted into vehicle part 35 with the insertion end 46 of the mounting unit until the locking projections 50 engage. As the mounting portion 20 is designed to be flexible the air bag package 18 can be folded upward so as to gain access to the mounting unit 14. This enables simple demounting of the air bag module 10.

Of course, in the elongate side head air bag shown here a number of mounting units 14 spaced apart from each other are provided along the length of the module.

In the embodiment shown here the inner clamping plate 32 and the outer clamping plate 34 are integrally connected to each other by means of a bendable portion 36. However, it is also possible to use two separate clamping plates 32, 34. In particular, embodiments are possible without clamping plates 32, 34 or else embodiments having only an inner clamping plate 32 or only an outer clamping plate 34. The shape of the clamping plates 32, 34 may be altered at will, for instance so as to obtain a better alignment with the body part 35 or an orientation of the air bag 12 in a certain direction.

In the embodiment shown here the mounting unit 14 is integrally formed; however, also embodiments including a multipart mounting unit 14 are possible. For instance, the way in which the inner clamping plate 32 and the outer clamping plate 34 are fixed in position relative to each other may be different. In particular, the mounting unit 14 need not comprise locking projections 48, 50. Other mounting possibilities are possible, for instance, a bolted connection.

Figure 8:
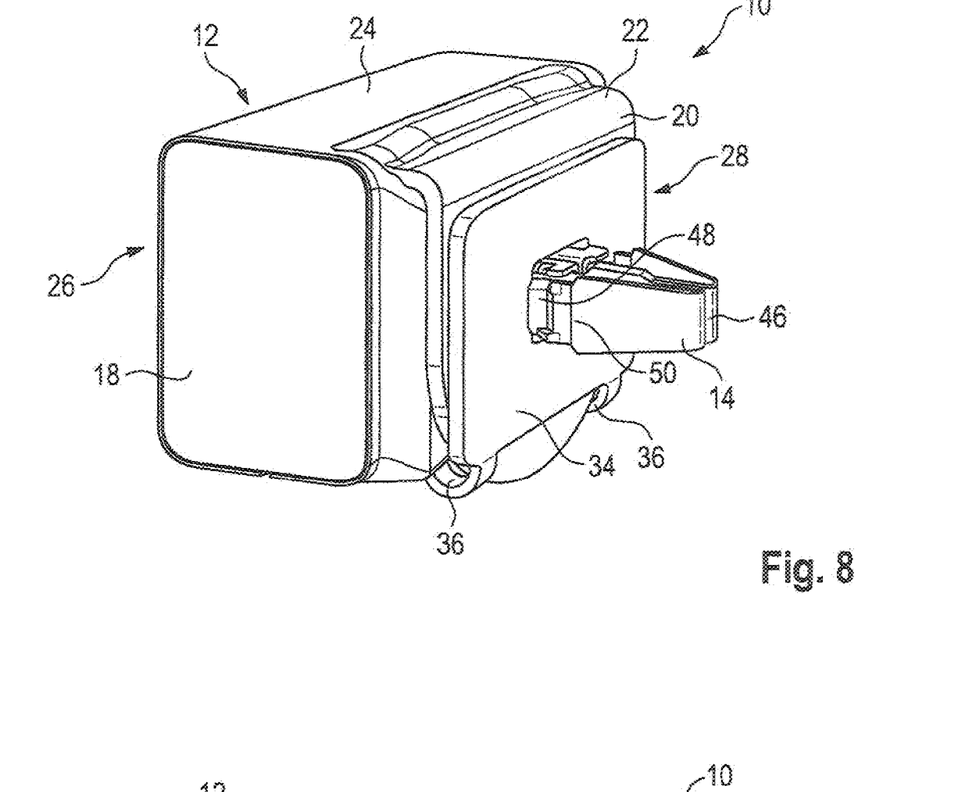
FIG. 8 shows a perspective sectional view of a further embodiment of an air bag module according to the present invention.
Figure 9:
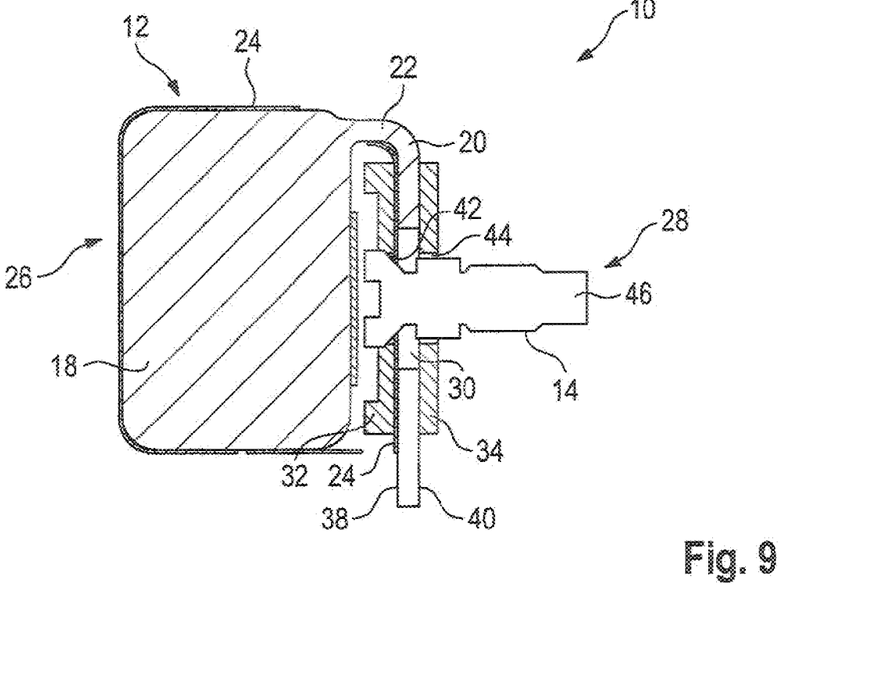
FIG. 9 shows a cross-sectional view of the air bag module according to FIG. 8.

A further embodiment of the air bag module 10 is shown in FIGS. 8 and 9. The air bag module 10 consists of the same components as the aforementioned air bag module 10, hence the reference signs introduced before are also used here.

The air bag module 10 in FIGS. 8 and 9 is different in that the inner clamping plate 32 is arranged inside the protective cover 24 and the mounting unit 14 extends through the protective cover 24.

As shown in FIG. 9, in this embodiment the air bag 12 cannot be folded away from the mounting portion 20. Hence, it is more securely fixed in position at a vehicle part and can, for instance, also be mounted on vehicle parts having inclined surfaces to better maintain its position.

Mounting of the air bag module 10 is shown in FIGS. 10 to 14. The air bag 12 essentially corresponds to the one according to the previous embodiment. The protective cover 24, however, differs from the one according to the previous embodiment in that a second axial slot 54 is provided through which the inner clamping plate 32 is inserted. In addition, the protective cover has an opening 56 through which the mounting unit 14 extends.

Figure 10:
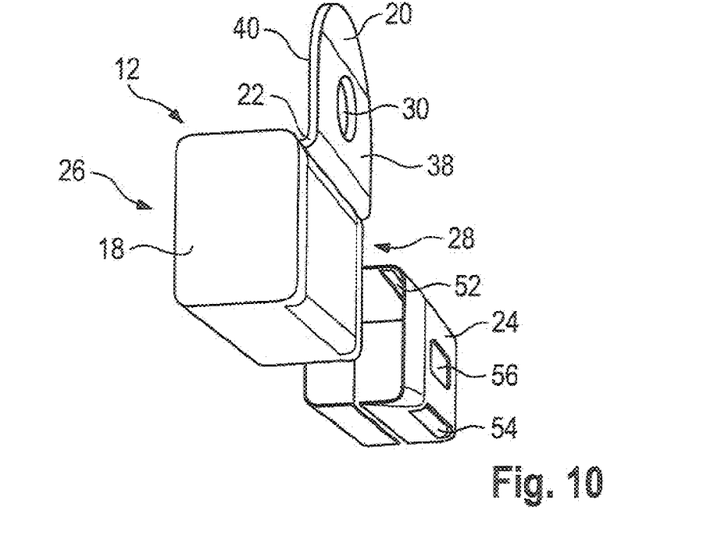
FIG. 10 shows a first step for assembly of the air bag module according to FIG. 8.
Figure 11:
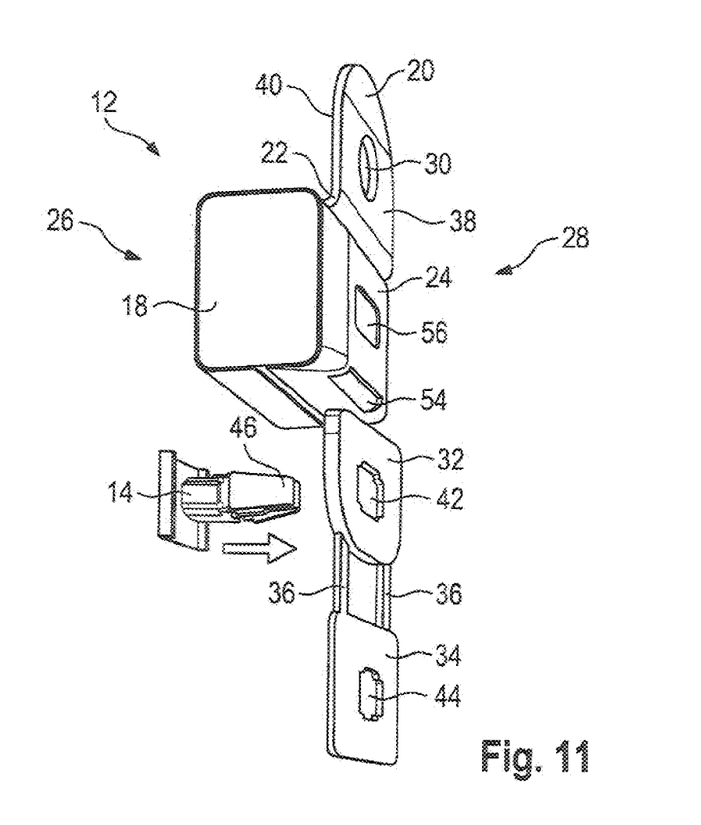
FIG. 11 shows a second step for assembly of the air bag module according to FIG. 8.
Figure 12:
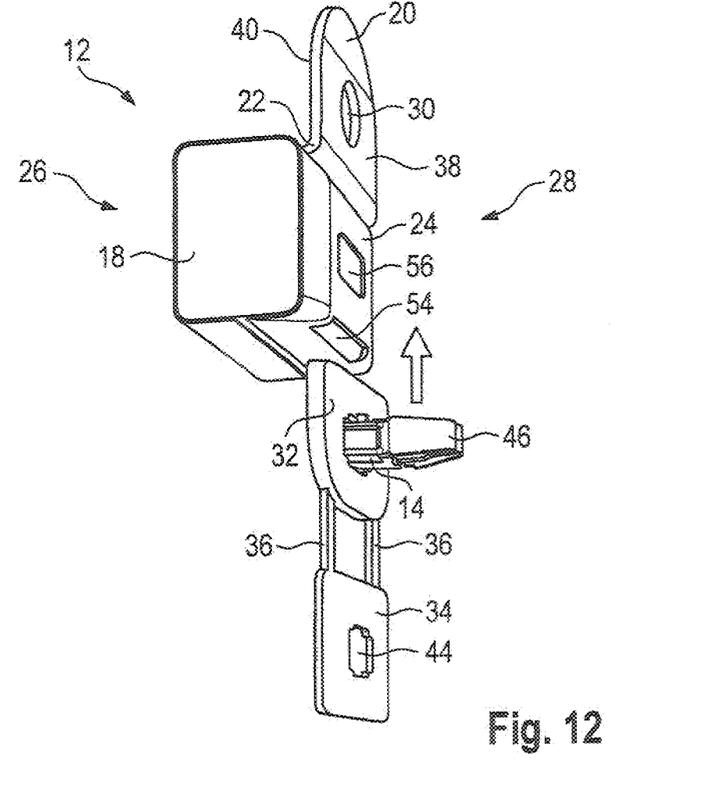
FIG. 12 shows a third step for assembly of the air bag module according to FIG. 8.
Figure 13:
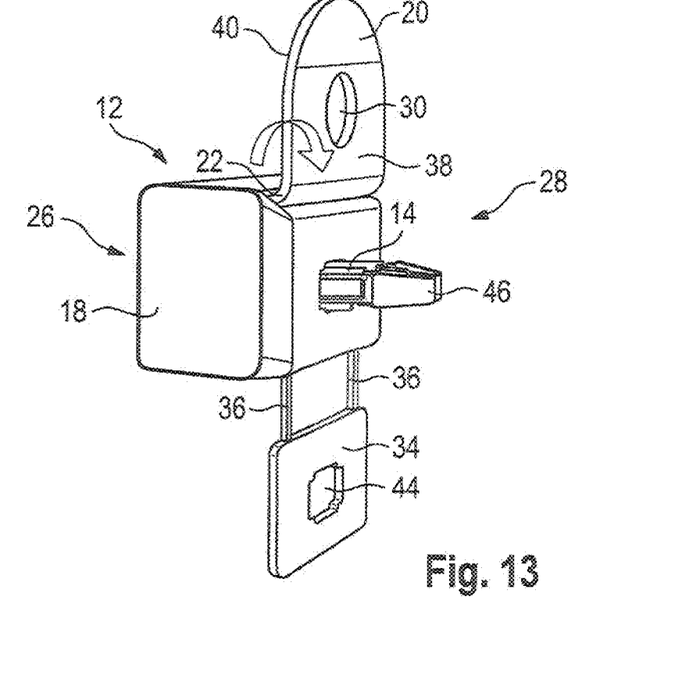
FIG. 13 shows a fourth step for assembly of the air bag module according to FIG. 8.

Just as in the previous embodiment, the folded package portion is slid into the protective cover 24 in the axial direction (FIG. 10). The mounting portion 20 is guided through the slot 52 from the inside such that it points away from the air bag 12.

In a next step (FIG. 11), the mounting unit 14 is, with its insertion end 46, guided through the opening 42 of the inner clamping plate 32. Subsequently, the inner clamping plate 32 is pushed from below through the slot 54 in the protective cover 24 and is pushed upwards (FIG. 12) such that it rests against the inner surface of the protective cover 24. With its insertion end 46, the mounting unit 14 is guided through the opening 56. Thus, the inner clamping plate 32 is located between the folded air bag package 18 and the protective cover 24. With its insertion end 46 the mounting unit 14 protrudes away from the air bag package 18.

Figure 14:
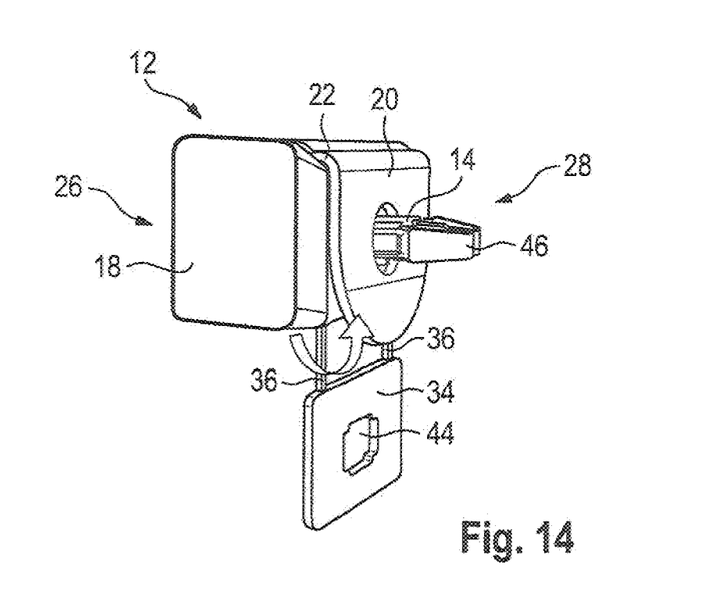
FIG. 14 shows a last step for assembly of the air bag module according to FIG. 8.

In the next step (FIG. 13) the mounting portion 20 of the air bag 12 is folded downwards onto the rear side of the air bag 12. Now, the front side 38 of the mounting portion 20 directly abuts on the protective cover 24. The opening 30 of the mounting portion 20 is placed over the insertion end 46 of the mounting unit 14 (FIG. 14).

In a last step, the outer clamping plate 34 is folded upwards against the rear side 40 of the mounting portion 20. In doing so, the insertion end 46 of the mounting unit 14 is guided through the opening 44 in the outer clamping plate 34. The mounting unit 14 is guided through the opening 44 in the outer clamping plate 34 until the locking projections 48 engage on the rear side of the outer clamping plate 34.

The mounting unit 14 is in particular made of metal and has a plate-shaped base portion from which a conically tapered part protrudes which may be designed as locking member. The locking member is in particular designed as double hook split at the insertion end 46.

The invention claimed is:

1. An air bag module (10) comprising:
   an air bag (12) comprising a folded package portion (18) and a mounting portion (20);
   at least one clamping plate (32, 34) positioned overlying the mounting portion (20); and
   a mounting unit (14) having an insertion end (46) that extends through the mounting portion (20) of the air bag (12) and the at least one clamping plate (32, 34), the mounting unit (14) comprising first locking projections (48) for fixing the mounting unit (14) to the at least one clamping plate (32, 34) and second locking projections (50) for fixing the air bag module (10) to a vehicle part.

2. The air bag module (10) according to claim 1, further comprising a protective cover (24) that encloses the folded package portion (18) of the air bag (12), the mounting portion (20) in the mounted state of the air bag module (10) being positioned between the protective cover (24) and the vehicle part, the protective cover (24) covering the mounting portion (20) in the mounted state of the air bag module (10).

3. The air bag module (10) according to claim 1, wherein the package portion (18) has a front side (26) and a rear side (28), the rear side (28) being that side which faces a vehicle part on which the air bag (12) is mounted, the mounting portion (20) being sandwiched between the rear side (28) and the vehicle part.

4. The air bag module (10) according to claim 3, wherein, in the mounted state, the mounting portion (20) is folded to extend along the rear side (28) of the package portion (28) and to position the insertion end (46) of the mounting unit (14) extending away from the package portion (18).

5. The air bag module (10) according to claim 1, wherein the at least one clamping plate (32, 34) comprises an inner clamping plate (32) and an outer clamping plate (34), the first locking projections (48) fixing the clamping plates (32, 34) to each other with the mounting portion (20) sandwiched therebetween, the clamping plates (32, 34) thereby clamping onto the mounting portion (20).

6. The air bag module (10) according to claim 1, wherein the mounting portion (20) is attached to an upper edge (22) of a rear side (28) of the package portion (18).

7. The air bag module (10) according to claim 1, wherein the mounting unit (14) extends with its insertion end (46) through a protective cover (24) and fixes the same in position at a vehicle part.

8. The air bag module (10) according to claim 1, wherein the at least one clamping plate comprises an inner clamping plate (32) and an outer clamping plate (34), the inner clamping plate (32) being located between the package portion (18) and the mounting portion (20), and the outer clamping plate (4) being located between the mounting portion (20) and the vehicle part and in that the mounting unit (14) fixes the clamping plates (32, 34) in position at the mounting portion (20).

9. The air bag module (10) according to claim 8, wherein, in the mounted state, the inner clamping plate (32) is at least partly located between a protective cover (24) and the package portion (18).

10. The air bag module (10) according to claim 8, wherein the inner clamping plate (32) and the outer clamping plate (34) are integrally connected to each other by means of a bendable portion (36).

11. The air bag module (10) according to claim 8, wherein the mounting unit (14) fixes the inner clamping plate (32) and the outer clamping plate (34) to each other.

12. The air bag module (10) according to claim 1, wherein the mounting unit (14) is made of metal.

13. The air bag module (10) according to claim 1, wherein the mounting portion (20) is a tongue of an air bag wall.

14. The air bag module (10) according to claim 1, wherein the air bag module (10) is a side head air bag.

15. The air bag module (10) according to claim 1, wherein the at least one clamping plate (32, 34) comprises an inner clamping plate (32) and an outer clamping plate (34) connected to each other by a bendable portion (36), the bendable portion (36) being bendable to position the inner and outer clamping plates (32, 34) adjacent to each other with the mounting portion sandwiched therebetween.

16. The air bag module (10) according to claim 1, wherein the insertion end (46) of the mounting unit (14) extends through aligned openings in the inner clamping plate (32), mounting portion (18), and outer clamping plate (34), the first locking projections (48) fixing the clamping plates (32, 34) to each other with the mounting portion (20) sandwiched therebetween, the clamping plates (32, 34) thereby clamping onto the mounting portion (20).

* * * * *